(12) United States Patent
Quinton et al.

(10) Patent No.: US 12,548,785 B2
(45) Date of Patent: Feb. 10, 2026

(54) FUEL CELL AND FUEL CELL CONTROL METHOD

(71) Applicant: SAFRAN POWER UNITS, Toulouse (FR)

(72) Inventors: Romain Quinton, Moissy-Cramayel (FR); Théophile Horde, Moissy-Cramayel (FR); Rémi André Armand Stephan, Moissy-Cramayel (FR)

(73) Assignee: SAFRAN POWER UNITS, Toulouse (FR)

( * ) Notice: Subject to any disclaimer, the term of this patent is extended or adjusted under 35 U.S.C. 154(b) by 529 days.

(21) Appl. No.: 18/248,134

(22) PCT Filed: Oct. 7, 2021

(86) PCT No.: PCT/FR2021/051740
§ 371 (c)(1),
(2) Date: Apr. 6, 2023

(87) PCT Pub. No.: WO2022/074338
PCT Pub. Date: Apr. 14, 2022

(65) Prior Publication Data
US 2023/0378488 A1    Nov. 23, 2023

(30) Foreign Application Priority Data
Oct. 7, 2020   (FR) ...................................... 2010264

(51) Int. Cl.
*H01M 8/04029*   (2016.01)
*H01M 8/0276*    (2016.01)
(Continued)

(52) U.S. Cl.
CPC ..... *H01M 8/04029* (2013.01); *H01M 8/0276* (2013.01); *H01M 8/04268* (2013.01); *H01M 8/0494* (2013.01); *H01M 8/2483* (2016.02)

(58) Field of Classification Search
CPC ........... H01M 8/04029; H01M 8/2483; H01M 8/0276; H01M 8/04268
See application file for complete search history.

(56) References Cited

U.S. PATENT DOCUMENTS

2010/0266918 A1   10/2010   Yi et al.

FOREIGN PATENT DOCUMENTS

| EP | 2037526 A1 | 11/2011 |
|----|------------|---------|
| JP | 2005141994 A | 6/2005 |

OTHER PUBLICATIONS

French Search Report issued in French Application No. FR 20 10264 on Jun. 30, 2021 (2 pages).

(Continued)

*Primary Examiner* — Olatunji A Godo
(74) *Attorney, Agent, or Firm* — Bookoff McAndrews, PLLC

(57) ABSTRACT

A fuel cell comprising an upper plate and a lower plate, a stack of energy cells, the stack being disposed between the upper plate and the lower plate, the stack being divided into a plurality of energy cell stages, a plurality of collectors separating each energy cell stage, three inlet vents extending from the lower plate to the upper plate, over the entire height of the stack of energy cells, the three inlet vents being configured to respectively provide the energy cells with heat transfer fluid, comburent fluid and liquid fuel, and a movable piston is disposed in each of the inlet vents, each piston being configured so that its position in the inlet vent selectively opens one or more of the fluid ducts of one or more (Continued)

energy cell stages, and wherein each piston is driven independently of the other pistons.

11 Claims, 6 Drawing Sheets

(51) Int. Cl.
    *H01M 8/04223*     (2016.01)
    *H01M 8/04858*     (2016.01)
    *H01M 8/2483*     (2016.01)

(56) References Cited

OTHER PUBLICATIONS

International Search Report and Written Opinion issued in International Application No. PCT/FR2021/051740 on Feb. 23, 2022 (14 pages).

[Fig. 1]
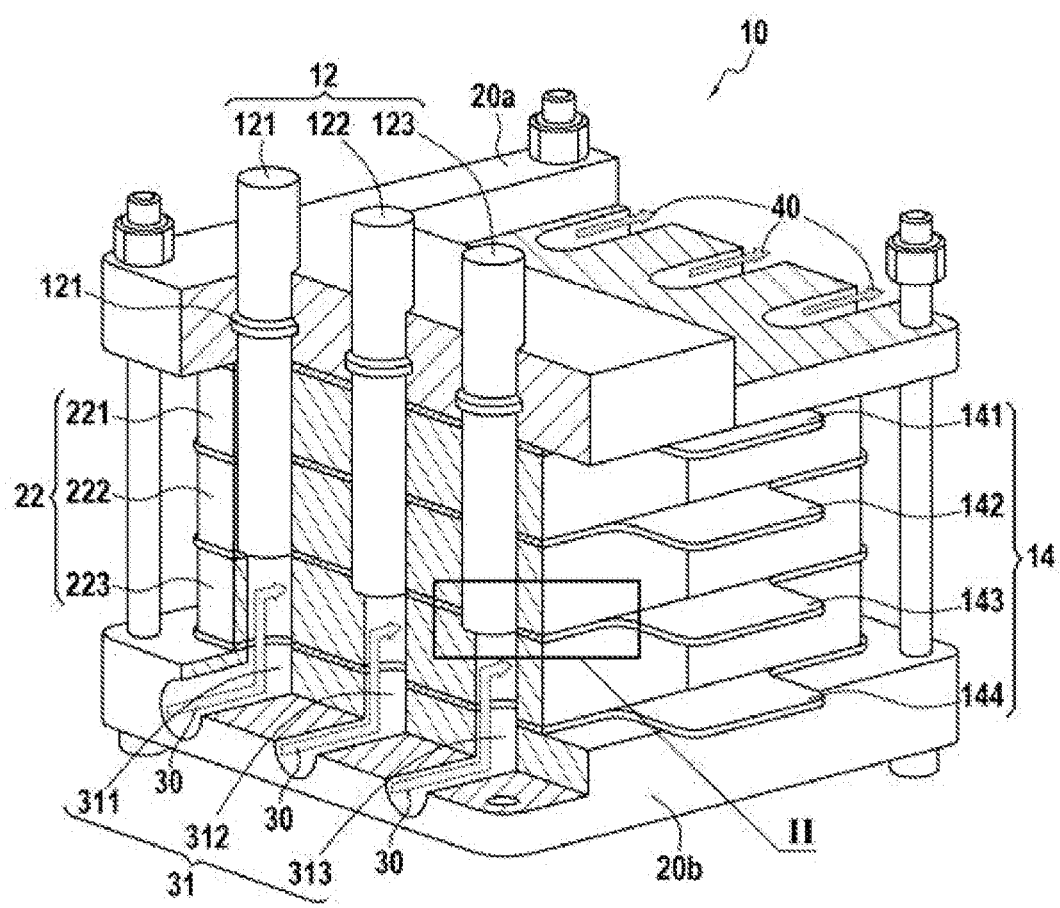

[Fig. 2]
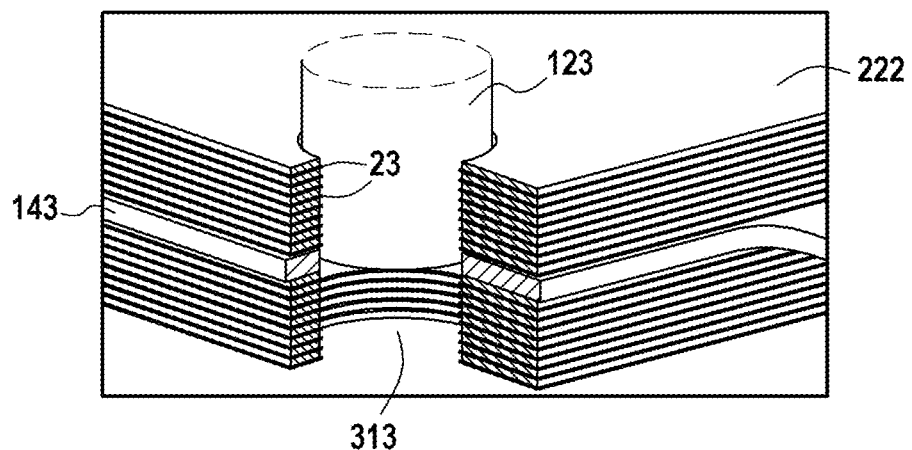
[Fig. 3A]
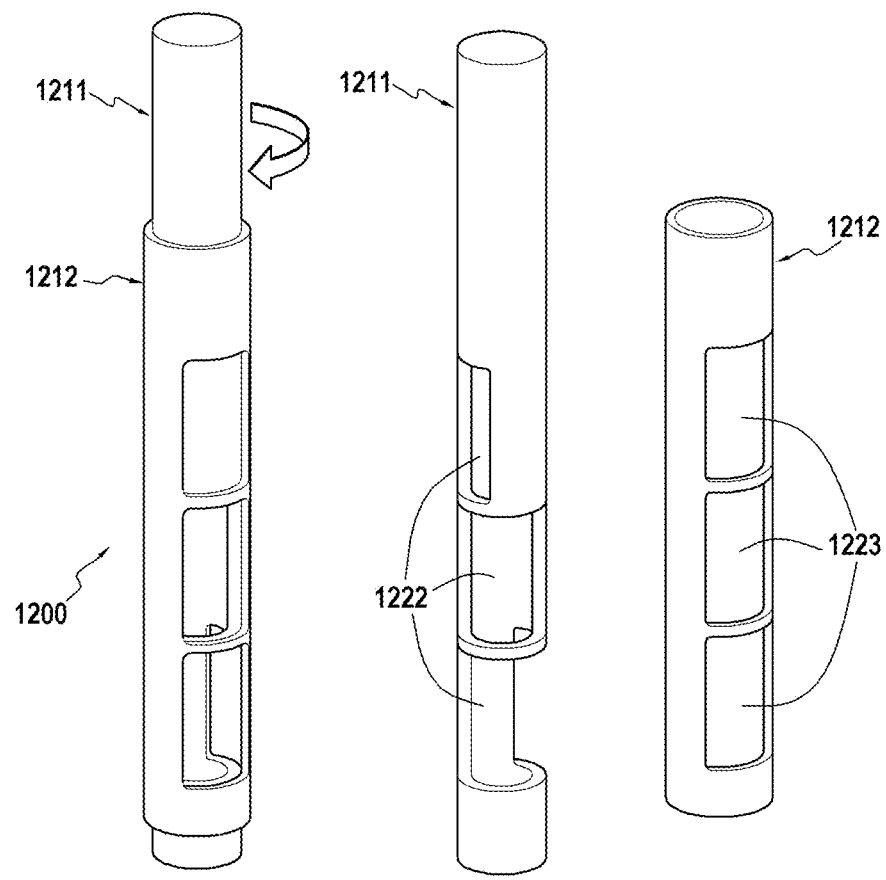

[Fig. 3B]
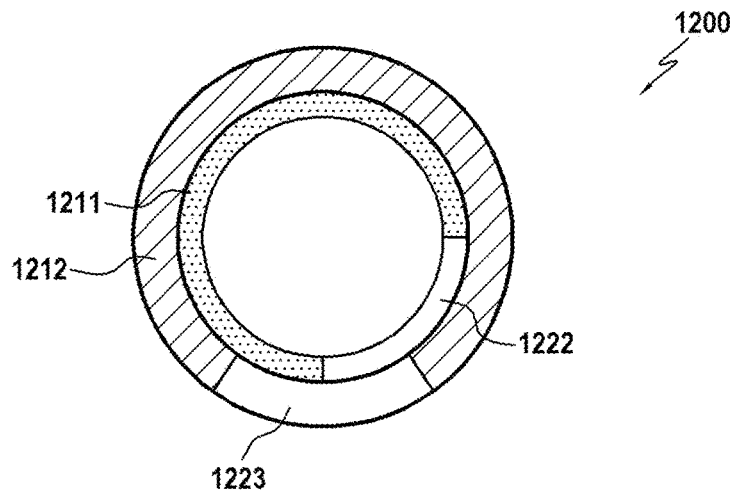
[Fig. 3C]
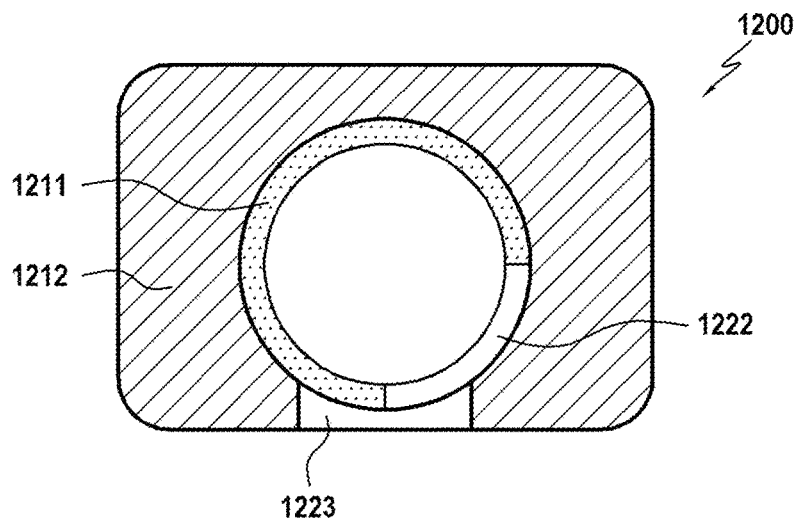
[Fig. 3D]
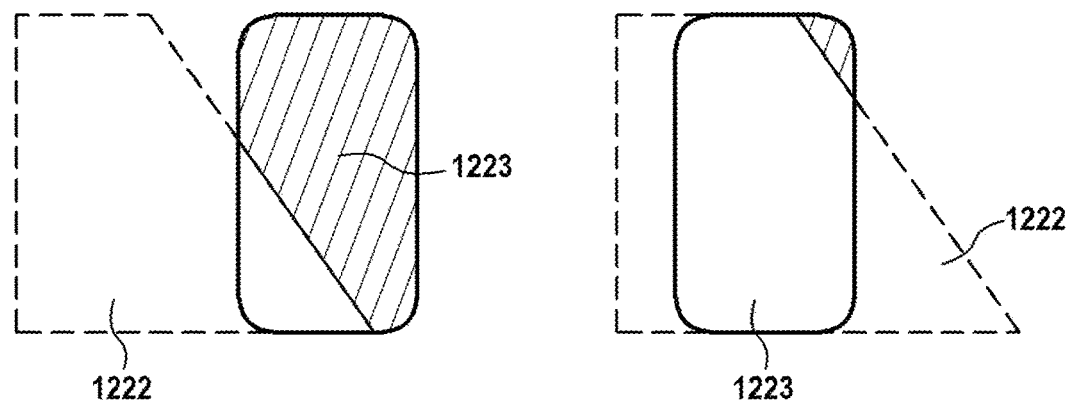

[Fig. 4A]
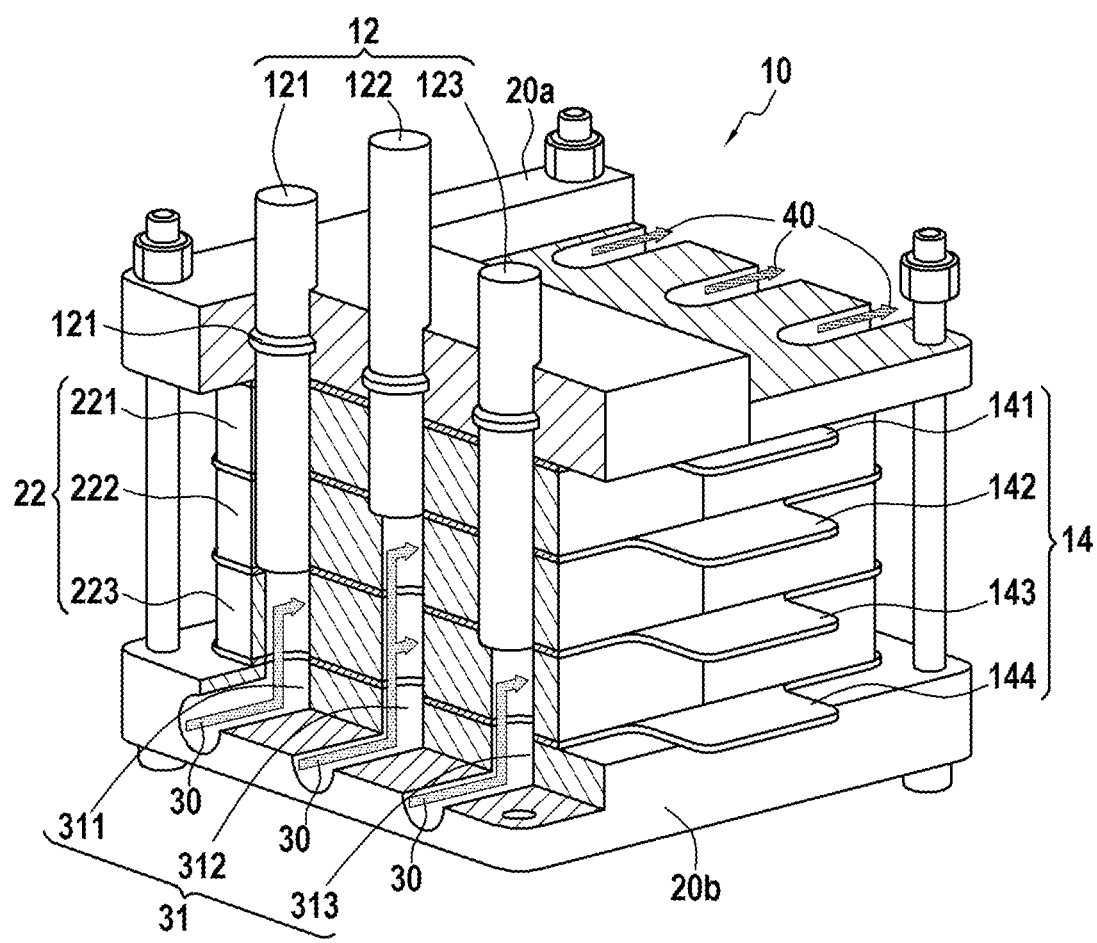

[Fig. 4B]
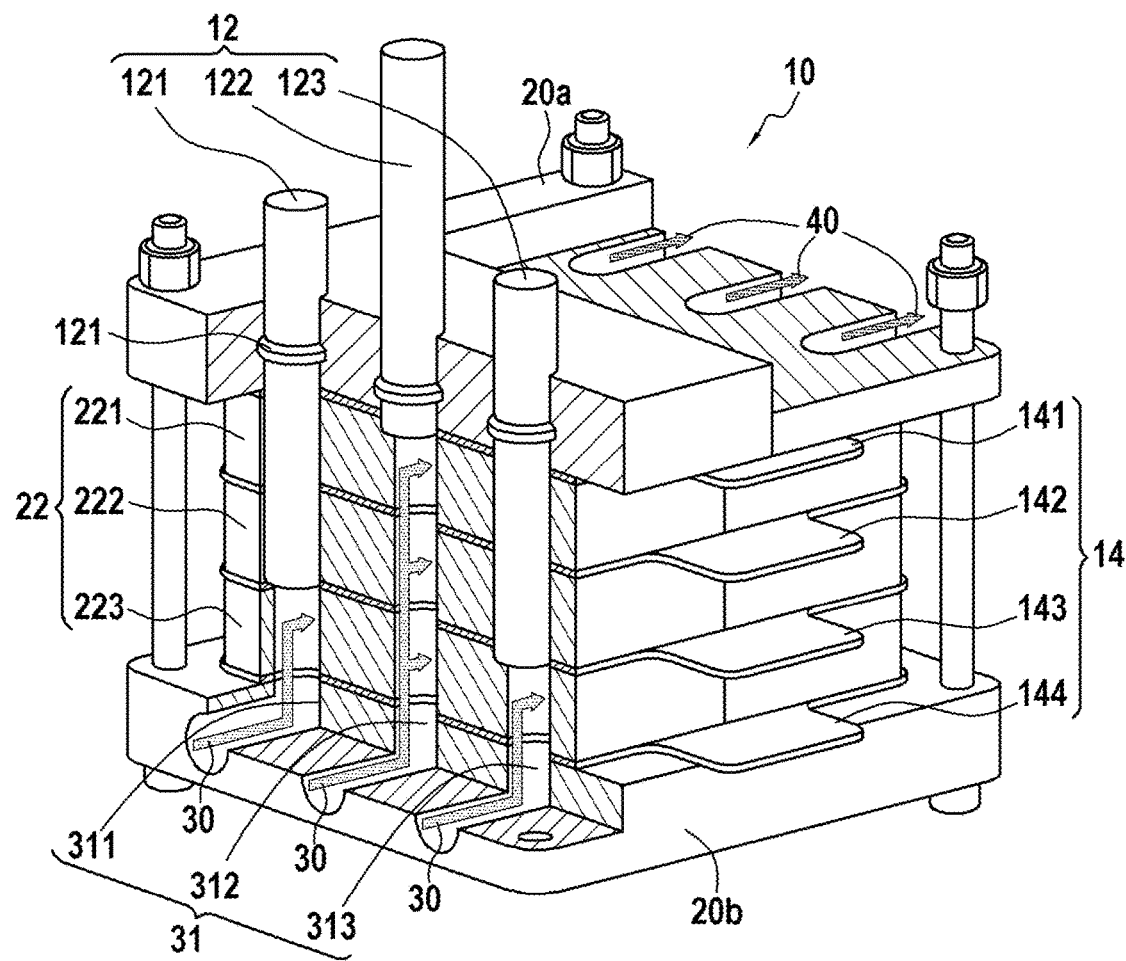

[Fig. 4C]
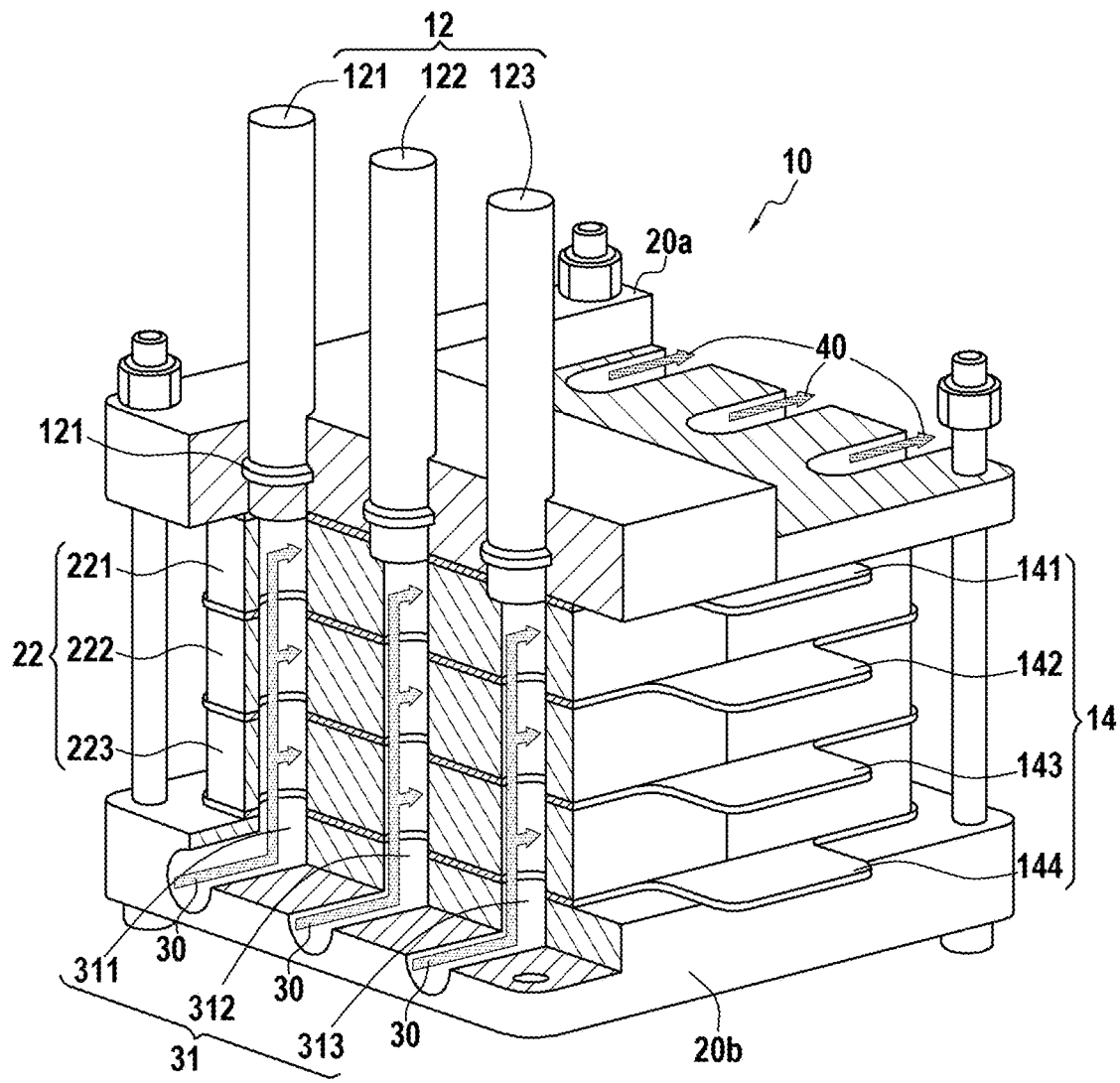
[Fig. 5]
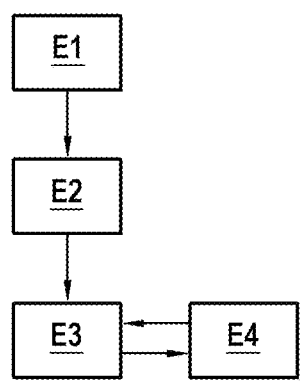

FUEL CELL AND FUEL CELL CONTROL METHOD

CROSS-REFERENCE TO RELATED APPLICATIONS

This is a National Stage Application under 35 U.S.C. § 371 of International Application No. PCT/FR2021/051740, filed Oct. 7, 2021, now published as WO 2022/074338 A1, which claims priority to French Patent Application No. 20 10264, filed on Oct. 7, 2020.

TECHNICAL FIELD

This summary relates to a fuel cell and a method for controlling such a cell.

PRIOR ART

Fuel cells generally comprise a stack of energy cells disposed between two current collectors. Each energy cell is composed of a membrane/electrodes assembly, formed of a proton-exchanging membrane disposed between an anode electrode and a cathode electrode. The membrane/electrodes assembly is itself disposed between two distributor plates, also known as bipolar plates. Within the stack of the elementary cells, the distributor plates disposed between two membrane/electrodes assemblies allow the circulation of hydrogen on one of their faces and air on the opposite face.

Each fuel cell has an optimal operating temperature which depends on the nature of the different components forming the stack. This temperature depends on the cell technology used and particularly the chemical reactions that occur inside it. In addition, to guarantee optimal operation along with a maximum lifetime of the fuel cell, it is recommended that the cell be able to be kept at a temperature in the vicinity of this optimal temperature, and in a way that is even throughout the stack.

However, during its operation, the electrochemical reaction taking place within each elementary cell is an exothermal reaction so that, if one wishes to maintain the fuel temperature at a temperature in the vicinity of the optimum operating temperature, it is advantageous to cool the fuel cell.

Moreover, to initiate the electrochemical reaction and quickly maximize the energy efficiency of the fuel cell, the stack of the fuel cell is preheated to the optimal operating temperature of the cell which is generally above the ambient temperature, namely above 100° C. (degrees Celsius), particularly in the case of a fuel cell with a membrane for exchanging high-temperature protons, called PEMFC HT (Proton Exchange Membrane Fuel Cell High Temperature). This preheating can be done by means of an electrical resistor which is powered by a battery. Moreover, the cooling of the fuel cell is done by a heat exchanger.

It will therefore be understood that it is known to fulfil the preheating function by means of a heating device and the cooling function by means of a cooling device, at least partly separate from the heating device. Although such an arrangement makes it possible to regulate the temperature of the fuel cell, it particularly involves a significant increase in the weight and bulk of the fuel cell. Furthermore, the heating device can require a battery, the weight of which can be in the region of 60 kg (kilograms) for a cell supplying in the order of 15 kWe.

There is therefore a need for improvement of the overall device, to reduce, among other things, the weight of the battery.

SUMMARY OF THE INVENTION

This summary relates to a fuel cell comprising an upper plate and a lower plate, a stack of energy cells, each energy cell including an ion-conducting electrolyte disposed between an anode and a cathode, two adjacent energy cells being separated by a bipolar plate, the stack being disposed between the upper plate and the lower plate, the stack being divided into a plurality of energy cell stages comprising one or more energy cells, a plurality of collectors separating each energy cell stage, three inlet vents extending from the lower plate to the upper plate, over the entire height of the stack of energy cells, the three inlet vents being configured to respectively provide the energy cells with heat transfer fluid, comburent fluid and liquid fuel, three outlet vents, each corresponding to an inlet vent, a plurality of fluid ducts, each fluid duct traversing an energy cell stage of the stack of energy cells, the fluid ducts extending from one of the inlet vents all the way to its respective outlet vent, and a movable piston is disposed in each of the inlet vents, each piston being configured so that its position in the inlet vent selectively opens the fluid duct or ducts of one or more energy cell stages, and wherein each piston is driven independently of the other pistons.

In this configuration, the fuel cell can be preheated by stages, which makes it possible to partially activate the cell. Specifically, some stages can be provided with fluid and therefore active, while others are not. Thus, the cell is capable of delivering variable power, according to the number of stages which are active in the cell.

This configuration therefore makes it possible to obtain a fuel cell with variable power. Consequently, the cell has good adaptability to the requirements of the user, while having operating ranges at moderate power. This particular point improves the lifetime of the cell, which wears out prematurely when it is used at extremely low or extremely high powers.

Moreover, when the pistons are driven independently, it is possible to preheat an inactive stage of the cell while other stages are active. In other words, the pistons can allow the providing of heat transfer fluid, comburent fluid and liquid fuel to the active stages, while they allow the providing of only hot heat transfer fluid to the inactive stages.

For this purpose, the fuel cell of this invention allows the use of the heat emitted by the reaction of the active stages of the cell to heat the inactive stages before their operation. Thus, since a part of the heat of the cell is re-used, the fuel cell of the invention can be used with a smaller battery than conventional fuel cells. Specifically, in general, the heat given off by the reaction is sufficient to entirely preheat the other stages.

Consequently, the weight of the battery used, for example, to heat the heat transfer fluid of the cell is reduced. Specifically, the battery can be configured to preheat the first stage only.

In certain embodiments, the cell comprises at least two stages having a different number of energy cells.

Thus, the modulation of the energy supplied by the fuel cell can be more effectively adjusted to the requirements of the user.

In certain embodiments, a seal is disposed in each energy cell of the stack, between the bipolar plate and the anode and/or cathode, and the seal extends partly into the inlet vents and is configured to interact with the pistons to provide sealing.

The presence of seals in the energy cells makes it possible to improve the sealing between the energy cells on the one hand and between the stages on the other. Thus, the circulation of fluid leakage in the stages that the user does not wish to use is lessened. This therefore reinforces the durability of the cell. This also makes it possible to reduce the fluid communication between the inlet and outlet vents.

In addition, the presence of seals in the cells guarantees a segregated circulation of fuel, comburent and heat transfer fluids from the inlet vents to the outlet vents, through the fluid ducts of the energy cells.

In other words, the seals are configured to interact with the pistons in the inlet vents. This interaction improves the seal between the energy cell stages, partially or entirely limiting the circulation of fluid in the cell stages through which the user does not wish fluid to circulate. Thus, the seals participate in the segregation of the circulation effected by the pistons, reinforcing this segregation.

In certain embodiments, the piston is configured to open the fluid ducts by a translational movement in the inlet vent from the lower plate toward the upper plate.

Thus, the providing of the stages with fluid is simplified since this providing can be done in successive stages, using a single duct for each fluid to be provided.

In certain embodiments, the piston is configured to open the fluid ducts by a rotational movement about its axis.

This configuration supplies an alternative for opening or closing the fluid ducts.

In certain embodiments, the cell comprises a piston having a perforated hollow body and a perforated envelope, wherein the perforated envelope comprises a plurality of windows, each opening selectively onto a fluid duct and an energy cell stage, and the perforated hollow body of the piston has a plurality of perforated portions, each configured to selectively open or close a window of the perforated envelope during the rotation of the piston about its axis.

In certain embodiments, the perforated portions have a trapezoidal shape with a small base intended to be higher than a large base along the top-to-bottom direction, for example in the form of a rectangular trapezoid.

In this application, the top-to-bottom direction is the direction normal to the lower and upper plates, which is oriented from the lower plate to the upper plate.

This configuration is particularly suited to the embodiment where the fluid ducts are open and closed by the rotation of the pistons about their axis. In particular, this configuration makes it possible to gradually open the fluid ducts of one and the same stage during the rotation of the piston.

This summary moreover relates to a method for controlling a fuel cell as previously defined comprising the following steps:
  a. A step of partial preheating of the cell wherein heat transfer fluid is supplied solely to the energy cell stage closest to the lower plate,
  b. A step of gradual preheating of the cell wherein heat transfer fluid is supplied successively to the energy cell stages stacked on the energy cell stage of the lower plate, from the stage closest to the lower plate to the stage closest to the upper plate.

This method makes it possible to preheat the stack in stages, and consequently makes it possible to use the pile partially. Thus, the cell can supply a variable voltage, as a function of the number of active stages. Moreover, this method also makes it possible to preheat inactive stages of the cell to make them active, while other stages are already active.

Moreover, this method is especially suited to the device previously described. In particular, this method makes it possible to use the heat of the inactive stages to preheat the inactive stages.

In certain embodiments, during the gradual preheating step, a part of the energy cell stages are provided only with heat transfer fluid while another part of the energy cell stages are provided with heat transfer fluid, liquid fuel and comburent fluid.

Thus, it is possible to change the power supplied by the cell over time, by heating then by activating the stages that had remained inactive. When the method is used with the cell previously described, the power supplied by the cell is chosen by electrically connecting a circuit to be powered to two collectors surrounding active energy cell stages.

Moreover, when all the stages have been preheated, it is possible to adjust only the providing of the energy cell stages with combustible and comburent fluid.

In certain embodiments, the providing of the energy cell stages with fluid is driven by the control of the position of the pistons in the inlet vents conveying the fluids.

In this configuration, the driving of the providing of fluid to the stages is facilitated.

In certain embodiments, the pistons are configured to open the fluid ducts of the energy cell stages, from the energy cell stage closest to the lower plate to the energy cell stage closest to the upper plate.

Thus, the providing of the cell stages with fluid is simplified.

In certain embodiments, the method further comprises at least one adjusting step after the operating step in which the pistons are positioned to respectively deactivate or reactivate active or inactive stages.

In this configuration, it is possible to adapt the power supplied by the cell in real time according to the requirements of the user.

In certain embodiments, electrical energy is produced by the cell during the gradual preheating step.

In certain embodiments, the inlet vents comprise a sealing element located at the level of the upper plate.

In certain embodiments, the method comprises an operating step after the gradual preheating step, wherein the heat transfer fluid, the liquid fuel and the comburent fluid is supplied to all the energy cell stages of the stack.

BRIEF DESCRIPTION OF THE DRAWINGS

The invention and its advantages will be better understood on reading the detailed description given below of different embodiments of the invention given by way of non-limiting example. This description refers to the appended pages of figures, wherein:

FIG. 1 shows a fuel cell according to a first embodiment, during the partial preheating of the cell.

FIG. 2 shows a detail view of the box II of FIG. 1.

FIG. 3A shows a piston according to a second embodiment.

FIG. 3B shows a section view of FIG. 3A along the plane IIIB.

FIG. 3C shows a section view of a piston according to an alternative of the second embodiment.

FIG. 3D shows a window of a piston according to another alternative of the second embodiment.

FIG. 4A shows a fuel cell according to the first embodiment at a time in the gradual preheating step.

FIG. 4B shows a fuel cell according to the first embodiment at another time in the gradual preheating step.

FIG. 4C shows a fuel cell according to the first embodiment during an operating step.

FIG. 5 schematically represents the steps of a method for controlling the fuel cell according to one of the embodiments.

DESCRIPTION OF THE EMBODIMENTS

FIG. 1 shows a fuel cell 10 according to a first embodiment comprising a stack of energy cell disposed between an upper plate 20a and a lower plate 20b. The upper plate 20a and the lower plate 20b are also known as terminal plates. A plurality of collectors 14, 141, 142, 143, 144 are disposed on either side and inside the stack of energy cells. The energy cells contained between two consecutive collectors 14 define an energy cell stage 22, 221, 222, 223. The fuel cell 10 comprises at least two energy cell stages 22 and therefore at least three collectors 14 with at least one collector 14 disposed in the stack of energy cells.

In the embodiment of FIG. 1 and by way of non-limiting example, the fuel cell 10 comprises three energy cell stages 22, 221, 222, 223 and four collectors 14, 141, 142, 143, 144.

Each energy cell comprises an ion-conducting electrolyte disposed between an anode and a cathode, two adjacent energy cells being separated by a bipolar plate.

The fuel cell 10 also comprises a fluid inlet 30 having at least three independent channels configured to provide the cell 10 with heat transfer fluid, liquid fuel and comburent fluid. The cell 10 comprises a fluid outlet 40 having at least three channels respectively configured to expel the heat transfer fluid, the liquid fuel and the comburent fluid of the cell 10.

Moreover, it should be noted that the heat transfer fluid supplied to the cell 10 is adapted to its state of operation. The heat transfer fluid supplies heat to the cell when it is preheating and recovers heat when it is supplying energy.

The cell 10 moreover comprises at least three inlet vents 31 extending from the lower plate 20b to the upper plate 20a, over the entire height of the stack of energy cells, the three inlet vents 311, 312, 313 being configured to respectively provide the energy cell stages 22 with comburent, heat transfer fluid and liquid fuel. Thus, the vent 312 provides the cell 10 with heat transfer fluid. In certain embodiments which are not shown by the figures, the cell 10 can comprise a greater number of inlet vents 31, having for example a plurality of vents 312 conveying heat transfer fluid.

The cell 10 moreover comprises three outlet vents extending from the lower plate 20b to the upper plate 20a, each of the three outlet vents being disposed facing one of the inlet vents 31. The outlet vents are connected to the fluid outlet 40.

This summary takes as non-limiting example inlet vents 311, 312, 313 and cylindrical and identical outlets. However, In certain embodiments, each inlet vent 31 can have a cylindrical shape with a circular or other type of base, different from the others or not different.

The cell 10 also comprises a plurality of fluid ducts traversing the energy cell stages 22. Each fluid duct traverses a single energy cell stage 221, 222, 223 of the stack of energy cells and is configured to provide said stage with heat transfer fluid, liquid fuel and comburent. The circulation of the heat transfer fluid is done alongside those of the liquid fuel and comburent inside the bipolar plates of the energy cells 22.

Thus, each fluid duct extends from one of the vents 31 to the outlet vent which faces said inlet vent 31.

A piston 121, 122, 123 is respectively disposed in each of the inlet vents 311, 312, 313, the pistons being configured to open or close the fluid ducts. In the first embodiment, the pistons 12 open or close the fluid ducts by a translational movement inside the inlet vents 31.

Although the pistons 12 are capable of moving over the entirety of the height of the inlet vents 31, they are driven such that their stroke stops at the level of the separation of the energy cell stages 22, i.e. at the level of the collectors 14. This stems from the fact that the collectors 14 are configured to delimit the stages and the providing of the energy cells with fluid is done by stages. Moreover, it will be understood that the outlet vents are devoid of a piston.

The pistons 12 can be driven independently and can move at different speeds and precisions. For this purpose, the piston 122 disposed in the inlet vent 312 can be driven at a lower speed than the pistons 121, 123. This control makes it possible to more gradually heat the energy cell stages 22 of the cell 10.

Seals 121 are disposed at the upper end of the inlet vents 31, at the level of the upper plate 20a, surrounding the pistons 12. These seals 121 confer sealing at the level of the upper plate 20a.

FIG. 2 shows a detail of FIG. 1 at the box II. This figure illustrates the seals 23 contained in each energy cell 22 of the stack, between the bipolar plate and the anode and/or cathode. These seals 23 are configured to provide a seal between the energy cells. Moreover, the seals 23 provide a seal along the pistons 12 when they travel through the inlet vents 31.

Thus, the stroke of the pistons 12 from the lower plate 20b to the upper plate 20a allows the gradual powering of the energy cells of the stages 22.

FIG. 3A shows a piston 1200 according to a second embodiment. FIG. 3B shows a section view of FIG. 3A in the plane IIIB. Each piston 1200 comprises a perforated hollow body 1211 and a perforated envelope 1212. Each perforated envelope 1212 of each piston 1200 is configured to fit the inner contour of one of the inlet vents 31. The perforated hollow body 1211 of the piston 1200 has a plurality of perforated portions 1222 and the perforated envelope 1212 comprises a plurality of windows 1223 configured to open onto the fluid ducts of an energy cell stage when the piston 1200 is disposed in an inlet vent 31.

The hollow body 1211 is configured to pivot about the axis of the piston 1200 in the perforated envelope 1212. The rotation of the hollow body 1211 in the perforated envelope 1212 is configured to selectively open or close one or more windows 1223 of the perforated envelope 1212 by making the windows 1222 of the hollow body 1211 colinear with the windows 1223 of the perforated envelope 1212.

En particular, as illustrated in FIG. 2, the windows 1223 are aligned along the direction of the shaft of the piston and the perforated portions 1222 of the hollow body 1211 are configured so that the rotation of the piston 1200 making it possible to open a fluid duct of a stage 22 makes it possible to also open all the stages between this stage 22 and the lower plate 20b.

FIG. 3C shows a section view of a piston 1200 according to an alternative of the second embodiment. In this alternative configuration, the outer surface of the perforated envelope 1212 of the pistons 1200 has a cylindrical shape with a rectangular base. It will then be understood that the corresponding inlet vent 31, receiving said perforated envelope 1212, also has a cylindrical shape with a rectangular base. In the configuration of the alternative of the second embodiment of FIG. 3C, the apices of the rectangular base are rounded.

Moreover, in such a configuration, the inner surface of the perforated envelope 1212 configured to interact with the hollow body 1211 has a cylindrical shape with a circular base.

FIG. 3D shows a window 1223 of a piston 1200 according to another alternative of the second embodiment. In this alternative configuration, the perforated portions 1222 of the hollow bodies 1211 are trapezoidal. In the embodiment of FIG. 3D, the perforated portions 1222 have the shape of a rectangular trapezoid, the small base being intended to be higher than the large base. Thus, the rotation of the pistons 1200 having trapezoidal perforated portions 1222 allows the partial opening of the fluid ducts of the energy cell stages 22. This advantageous configuration can, for example, allow a more gradual heating of the energy cell stages 22.

The two alternative configurations illustrated by FIGS. 3C and 3D are mutually compatible.

FIG. 5 schematically represents a method for controlling the fuel cell 10 according to an embodiment. The controlling method comprises a step E1 of partial preheating, a step E2 of gradual preheating and a step E3 of operation. This method will be described using the cell 10 according to the first embodiment of the pistons 12. However, this method applies mutatis mutandis to a cell 10 comprising pistons 1200 according to the second embodiment.

During the partial pre-heating step E1, at first, the energy cell stage 223 closest to the lower plate 20b is supplied with heat transfer fluid, while the other stages 22 are not supplied. Thus, the pistons 12 are positioned at the level of the collector 143 separating the energy cell stage 223 closest to the lower plate 20b from the stage 222 which is directly superimposed on it, and the cell 10 is directly provided with heat transfer fluid.

When the stage 223 closest to the lower plate 20b is preheated, the cell 10 is provided with liquid fuel and comburent fluid. Thus, the comburent fluid and liquid fuel ducts of the stage 223 closest to the lower plate 20b are provided and the energy cell stage 223 produces energy.

FIGS. 4A and 4B show the cell 10 during the gradual preheating step E2. During the gradual preheating step E2, the piston 122 disposed in the inlet vent 312 is driven to position itself at the level of the collectors 141, 142 separating the energy cell stages 221, 222 stacked on the stage 223 closest to the lower plate 20b. The other pistons 12 keep their position as long as the stages 221, 222 are not preheated.

In particular, it can be seen in FIG. 4A that the piston 122 disposed in the inlet vent 312 providing the cell 10 with heat transfer fluid becomes placed at the level of the collector 142. Thus, the stage 222 can be preheated while the stage 223 is already active. However, the stage 221 is not preheated and can be preheated later on.

Moreover, as shown in FIG. 4B, several stages 222,221 can be simultaneously heated during the gradual preheating step E2. Specifically, the piston 122 disposed in the inlet vent 312 providing the cell 10 with heat transfer fluid can be placed at the level of the collector 141, which allows the simultaneous preheating of the stages 222 and 221.

Note that, during the gradual preheating step E2, when the stage 222 has been preheated, it is possible to place the pistons 121, 123 disposed in the inlet vents 311, 313 providing the cell 10 with liquid fuel and comburent fluid at the level of the collector 142 in order to provide the stage 222 with liquid fuel and comburent. In this case, the stage 222 can supply energy with the stage 223.

FIG. 4C shows the cell 10 during the operating step. During the operating step E3, after all the stages 22 have been preheated, the pistons 12 disposed in the inlet vents 31 providing the cell 10 with liquid fuel and comburent are positioned at the level of the collector 141 closest to the upper plate 20a, thus allowing the providing of all the stages 22 with liquid fuel and comburent. During this step, all the stages 22 supply energy.

In certain configurations, the cell 10 is used only partially, and certain stages remain inactive during the step E3. In this case, the pistons 12 are positioned at the level of the collector 14 separating the last active stage 22 from the first inactive stage 22.

Moreover, in certain configurations, the method comprises an adjusting step E4 wherein the pistons can be positioned to respectively deactivate or reactivate active or inactive stages 22, as a function of the power requirements of the user.

For example, considering a cell 10 in the operating step E3 with all the active stages 22 and a user who wishes to reduce the power supplied by the cell 10, an adjusting step E4 can be carried out. In this adjusting step E4, the pistons 12, placed at the collector 141, are replaced at one of the collectors 142 or 143 to respectively deactivate the stage 221 or the stages 221 and 222. This example of an adjusting step E4 can conversely be taken for the reactivation of previously deactivated stages.

Once the pistons 12 have been replaced, the cell 10 once again enters the operating step E3. Note moreover that the cell 10 can undergo several adjusting steps E4 over its use, according to the requirements of the user.

Although this invention has been described with reference to specific exemplary embodiments, it is obvious that modifications and changes can be made to these examples without departing from the general scope of the invention as defined by the claims. In particular, individual features of the different embodiments illustrated/mentioned can be combined in additional embodiments. Consequently, the description and drawings must be considered in an illustrative rather than a restrictive sense.

It is also obvious that all the features described with reference to a method are transposable, alone or in combination, to a device, and conversely, all the features described with reference to a device are transposable, alone or in combination to a method.

The invention claimed is:
1. A fuel cell comprising an upper plate and a lower plate,
a stack of energy cells, each energy cell including an ion-conducting electrolyte disposed between an anode and a cathode, two adjacent energy cells being separated by a bipolar plate, the stack being disposed between the upper plate and the lower plate, the stack being divided into a plurality of energy cell stages comprising one or more energy cells,
a plurality of collectors separating each energy cell stage,
three inlet vents extending from the lower plate to the upper plate, over the entire height of the stack of energy cells, the three inlet vents being configured to respectively provide the energy cells with heat transfer fluid, comburent fluid and liquid fuel,
three outlet vents, each corresponding to an inlet vent,
a plurality of fluid ducts, each fluid duct traversing an energy cell stage of the stack of energy cells, the fluid ducts extending from one of the inlet vents all the way to its respective outlet vent, and a movable piston is disposed in each of the inlet vents, each piston being configured so that its position in the inlet vent selectively opens the fluid duct or ducts of one or more energy cell stages, and wherein each piston is driven independently of the other pistons.

2. The fuel cell as claimed in claim 1, comprising at least two stages having a different number of energy cells.

3. The fuel cell as claimed in one of claim 1, wherein a seal is disposed in each energy cell of the stack, between the bipolar plate and the anode and/or cathode, and the seal extends partly into the inlet vents and is configured to interact with the pistons to provide sealing.

4. The fuel cell as claimed in claim 1, wherein the piston is configured to open the fluid ducts by a translational movement in the inlet vent from the lower plate toward the upper plate.

5. The fuel cell as claimed in claim 1, wherein the piston is configured to open the fluid ducts by a rotational movement about its axis.

6. The fuel cell as claimed in claim 5 comprising un piston having a perforated hollow body and a perforated envelope, wherein the perforated envelope comprises a plurality of windows, each opening selectively onto a fluid duct and an energy cell stage, and the perforated hollow body of the piston has a plurality of perforated portions, each configured to selectively open or close a window of the perforated envelope during the rotation of the piston about its axis.

7. A method for controlling a fuel cell as claimed in claim 1 comprising the following steps:

a. A step of partial preheating of the cell wherein heat transfer fluid is supplied solely to the energy cell stage closest to the lower plate, b. A step of gradual preheating of the cell wherein heat transfer fluid is supplied successively to the energy cell stages stacked on the energy cell stage closest to the lower plate, from the stage closest to the lower plate to the stage closest to the upper plate.

8. The method for controlling a fuel cell as claimed in claim 7 wherein, during the gradual preheating step, a part of the energy cell stages are provided only with heat transfer fluid while another part of the energy cell stages are provided with heat transfer fluid, liquid fuel and comburent fluid.

9. The method for controlling a fuel cell as claim 7, wherein the providing of the energy cell stages with fluid is driven by the control of the position of the pistons in the inlet vents conveying the fluids.

10. The method for controlling a fuel cell as claimed in claim 9, wherein the pistons are configured to open the fluid ducts of the energy cell stages, form the energy cell stage closest to the lower plate to the energy cell stage closest to the upper plate.

11. The method for controlling a fuel cell as claimed claim 7, comprising at least one adjusting step after the operating of operating step in which the pistons are positioned to respectively deactivate or reactivate active or inactive stages.

* * * * *